United States Patent [19]

Champ et al.

[11] 3,887,366

[45] June 3, 1975

[54] CYANINE PIGMENTS IN ELECTROPHOTOGRAPHIC PROCESSES

[75] Inventors: Robert Bruce Champ; Meredith David Shattuck, both of San Jose, Calif.

[73] Assignee: International Business Machines Corporation, Armonk, N.Y.

[22] Filed: Mar. 30, 1971

[21] Appl. No.: 129,637

[52] U.S. Cl. .................... 96/1 PC; 96/1.5; 96/1.6
[51] Int. Cl. ............................................. G03g 5/06
[58] Field of Search ................ 96/1, 1.5, 1.6, 1.7; 252/501; 117/201; 260/240, 240.1

[56] References Cited
UNITED STATES PATENTS

| | | | |
|---|---|---|---|
| 2,663,636 | 12/1953 | Middleton | 96/1.5 |
| 3,041,166 | 6/1962 | Bardeen | 96/1 |
| 3,196,011 | 7/1965 | Gunther et al. | 96/1.1 |
| 3,250,615 | 5/1966 | Van Allan et al. | 96/1.6 |
| 3,257,204 | 6/1966 | Sus et al. | 96/1.5 |
| 3,507,692 | 4/1970 | Ghys et al. | 117/201 |
| 3,542,547 | 11/1970 | Wilson | 96/1.6 |
| 3,615,414 | 10/1971 | Light | 96/1.6 |

OTHER PUBLICATIONS

Kearns, "Kinetics and Mechanism of Photoconductivity of Metal-Free Phthalocyanine," pp. 7–12, 1963.

*Primary Examiner*—Norman G. Torchin
*Assistant Examiner*—John L. Goodrow
*Attorney, Agent, or Firm*—Joseph G. Walsh

[57] ABSTRACT

Electrophotographic processes using as the photoconductive material cyanine pigment present as very small particles.

8 Claims, No Drawings

CYANINE PIGMENTS IN ELECTROPHOTOGRAPHIC PROCESSES

BACKGROUND OF THE INVENTION

1. Field of the Invention

This invention relates to electrophotographic processes and photoconductive plates used therein. In particular it is concerned with plates comprising certain cyanine pigments.

2. Description of Prior Art

U.S. Pat. No. 3,542,548 lists certain cyanine pigments, structurally different from those of the present invention. The pigments of that patent are not photoconductive, but are used as sensitizers for photoconductors.

U.S. Pat. No. 2,663,636, concerned with a binder type photoconductive element, suggests micropulverizing organic photoconductors.

In other places in the prior art, milling of photoconductor to obtain small particle size is also shown.

No prior art reference of which we are aware, however, suggests the advantages obtained in the present invention, which involves the use of certain selected cyanine compounds as very small sized particles in electrophotographic reproduction processes.

SUMMARY OF THE INVENTION

The cyanine pigments of the present invention include those having the formula

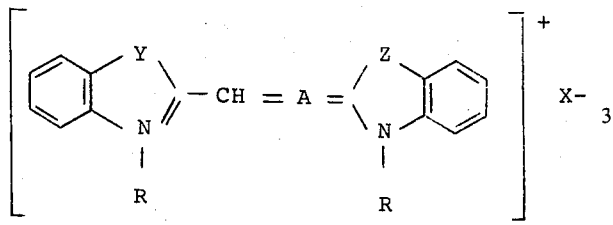

wherein R is selected from the group consisting of methyl, ethyl and allyl, X is selected from the group consisting of the chloride, bromide and iodide ions, Y and Z are each selected from the group consisting of O, S and Se, and A is selected from the group consisting of hydrocarbon chains having the formula

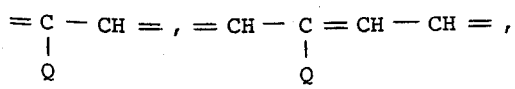

and

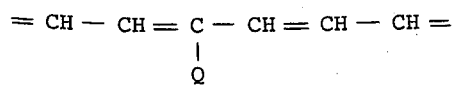

wherein Q is selected from H, $CH_3$ and $C_2H_5$.

Expressed in other words, A in the above formula may be defined as the moiety required to form between the two heterocyclic rings a hydrocarbon chain having a total of 3, 5, or 7 carbon atoms in the main line, conjugated unsaturation, and either no branching, or a methyl or ethyl branch on the central carbon atom.

It has now been discovered that when pigments having the formula disclosed above are present in an electrophotographic plate in particle size less than about 5 microns in diameter, and preferably less than 1 micron in diameter, they are very effective photoconductors.

There are several well known electrophotographic reproduction processes in current use. They differ in the particular way in which they are carried out, particularly the sequence in which electric charging (usually with a corona) and illumination are carried out. All electrophotographic reproduction processes, however, involve the process step of selectively rendering portions of a photoconductor electrically conductive by selective exposure to light. The pigments of the present invention are useful in all such processes.

Compounds of the above formulas may all be prepared by well known procedures picking the properly substituted starting materials in each case, and carrying out the synthesis by methods in accordance with the teachings of the prior art.

It must be emphasized that the particles of pigment are not dissolved; i.e., they are not present as single molecules in a solution. Rather they are present as polymolecular aggregates. The use of the word pigment to describe the materials is in accord with this fact, since the word pigment in the art is usually used to describe a colored particle which is not in solution, as contrasted to the word dye, which is used to describe colored material which is in solution.

As mentioned previously, the pigment size should be less than 5 microns in diameter. Preferably the pigment size is less than about 1 micron in diameter. Furthermore, there is some evidence to suggest that in at least some cases it is advantageous that the particle sizes are close to uniform.

In accordance with the present invention, the pigments may be used in the form of a thin layer on a conductive substrate. This layer may be overcoated with a charge transport layer. Systems of this sort are described in U.S. Pat. No. 3,598,582, issued Aug. 10, 1971.

Alternatively, the pigments may be present in a binder medium, which may be either photoconductive per se or not photoconductive per se. There are many binders known to the prior art as being useful in the making of photoconductive plates. They include numerous resins and the like. Many such materials are mentioned, for example, in U.S. Pat. Nos. 3,121,006 and 3,121,007. Among the resins found useful in the present invention, polyesters have been particularly outstanding, for example, Mylar adhesive 49,000, which is duPont's trademark for a 60/40 copolymer of ethylene terephthalate and ethylene isophthalate. Polyketones are also useful, e.g., PK 252, Union Carbide's trademark for a polyketone. It is not, however, necessary that the binder be a resin. For example, U.S. Pat. No. 3,406,063 lists non-polymeric coating-forming materials which may also be used in the present invention. It should also be mentioned that sucrose benzoate gives especially outstanding results when used as a binder in the present invention.

To increase the photoconductivity of some of the above-described photoconductive pigments, there may be incorporated in the pigment either a sensitizer or an activator which is also known as an electron acceptor or, in some cases, when the photoconductor is an electron acceptor, an electron donor. Examples of such dye sensitizers and activators are set forth in U.S. Pat. Nos. 3,037,861, 3,169,060, and 3,287,113. In addition, when it is desired to have the photoconductive element exhibit persistent conductivity, the dye sensitizer and activator combinations described in U.S. Pat. No. 3,512,966 may be used in the preparation of such photoconductive elements.

From about one percent, up to about 50%, by weight of the binder may be pigment, depending upon the particular pigment and the particular binder.

Many of the pigments useful in the present invention have been listed in the Colour Index published jointly by the Society of Dyers and Colourists in England and the American Association of Textile Chemists and Colorists, Lowell, Mass, Second Edition, 1956. In some cases below, they are referred to by their Color Index number, or C.I.

In the examples below, when the expression Full Tungsten or F.T. is used, it means that the light source was a tungsten halogen lamp, 75 watts, 28 volts, at a distance of approximately 15 centimeters.

While the invention will be particularly shown and described with reference to preferred embodiments thereof, it will be understood by those skilled in the art that various changes in the form and details may be made therein without departing from the spirit and scope of the invention.

EXAMPLES

EXAMPLE 1

The pigment used in this experiment was 3,3'-diethyl benzothiazolium dicarbocyanine iodide, hereinafter called Pigment I.

A 20% solid mix of Pigment I in tetrahydrofuran (THF) was Spex-milled for 30 minutes with steel balls.

The milled pigment was mixed at 10% by weight concentration with a binder of Mylar adhesive 49,000 in THF. This mixture was coated on rough stock aluminum at a 5 mil wet gap and cured for 10 minutes at 100°C. The electrometer data were as follows: using a 1.47 Neutral Density Screen and opal glass, the sensitivity (T ½) in negative mode was 0.18 seconds, and the charge acceptance 500 volts, also in the negative mode.

EXAMPLE 2

At a 10% solids level, Pigment I was Spex-milled in THF for 30 minutes. The milled pigment was then added to Mylar adhesive 49000 in THF at a 50% level of addition. This dispersion was coated (wet gap of 15 microns) on aluminum rough stock subbed with a 1 micron thick layer of Milvex 4000 polyanide resin and cured for 10 minutes at 100°C. (Milvex 4000 is General Mills brand of fatty acid--diamine copolymer polyamide). The electrometer data were: C.A. (+)500 volts; sensitivity (T ½) 0.2 seconds (1.16 ND + O.G). This sensitivity is approximately 6 times that of the organic photoconductor currently in commercial use.

EXAMPLES 3–7

Pigments with the following structures were Spex-mixer milled in THF at 10% solids for 30 minutes. They were then added at 20% level of addition by weight to a hot melt of trinitrofluorenone (TNF), thoroughly mixed and coated by doctor blading at a thickness of 10 microns on a rough stock aluminum substrate.

The electrometer data were as follows:

|  | | C.A. | T 1/2 (Full Tungsten) |
|---|---|---|---|

Ex. 3

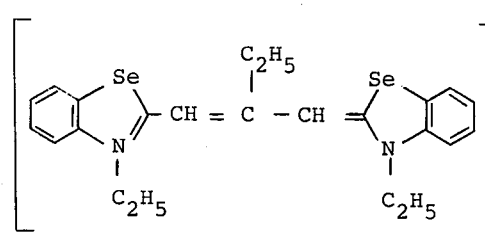

| | I⁻ | 150V. (−) | 0.3 Sec. |

Ex. 4

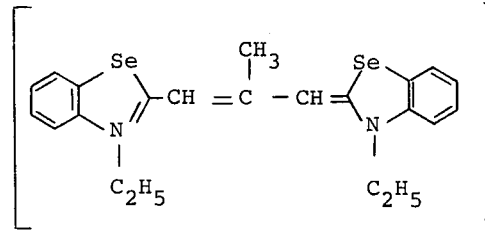

| | I⁻ | 800V. (−) | 0.15 Sec. |

Ex. 5

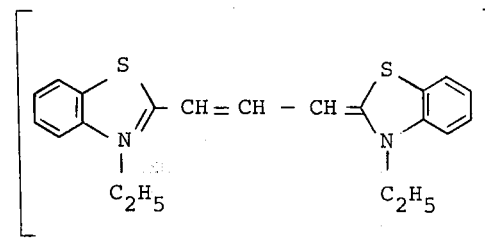

| | I⁻ | 300V. (−) | 0.15 Sec. |
| | | 100V. (−) | 0.2 Sec. |

Ex. 6

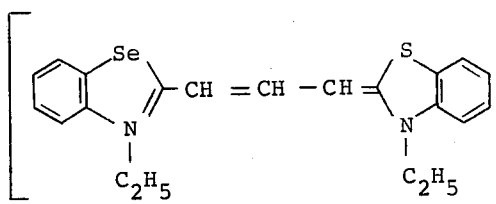

C.A.    T 1/2 (Full Tungsten)

300V.    0.25 Sec.

Ex. 7

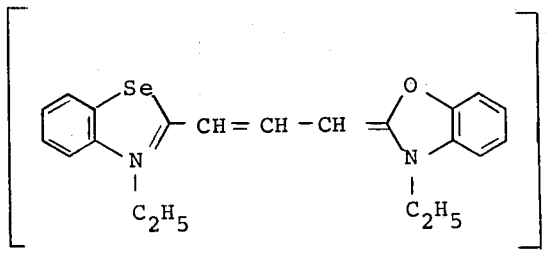

200V. (−)    0.25 Sec.

EXAMPLES 8–11

The cyanine pigments listed below were Spex milled in 10% solutions in THF. The milled pigments were each added to mixtures of Mylar adhesive 49,000 and TNF in THF and the mixtures milled together overnight with the addition of a quarter percent by weight of silicone lubricant as a flow aid. The weights of the TNF and the Mylar adhesive 49000 were equal. The weight of the cyanine pigment in each case was 10% of the total solids. The final mixture was coated with a doctor blade on a rough stock aluminum substrate. The plates were cured overnight at 55°C. The electrometer results (full tungsten) were as follows.

| | C.A. (Volts) | | T 1/2 (Sec) | |
|---|---|---|---|---|
| | + | − | + | − |

Ex. 10

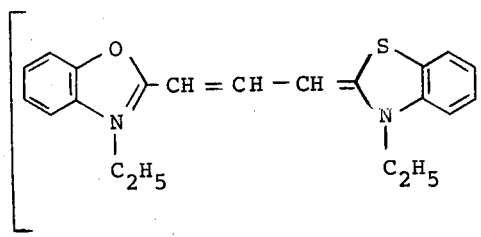

I⁻    250   210   2.0   2.1

Ex. 11

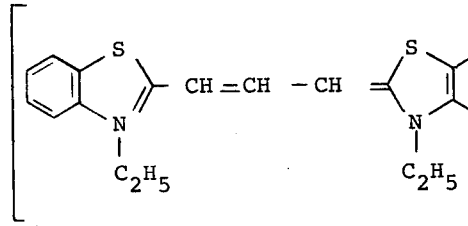

I⁻    520   870   3.5   1.5

Ex. 8

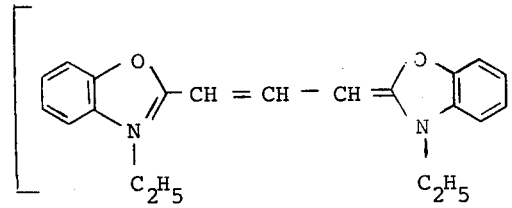

I⁻    420   520   4.0   1.7

Ex. 9

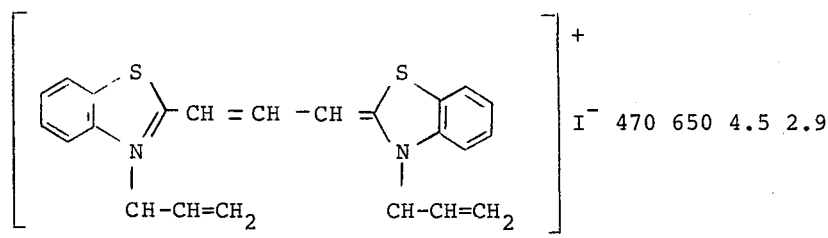

| | C.A. (Volts) | | T 1/2 (Sec) | |
|---|---|---|---|---|
| | + | − | + | − |
| I⁻ | 470 | 650 | 4.5 | 2.9 |

EXAMPLE 12

A photoconductive plate was prepared by adding 15 parts small particle size pigment 1 together with 5 parts 2,4,7-trinitrofluorenone, 40 parts sucrose benzoate and 40 parts Mylar adhesive 49,000. Tetrahydrofuran was used as the coating solvent. The dispersion thus obtained was coated on a matte finish aluminum plate. The photosensitivity of the plate was approximately 10 times that of a commercial organic photoconductor with a charge acceptance of +800 volts.

EXAMPLE 13

A plate was prepared by adding 3,3''-diethyl-9-methyl thiacarbocyanine iodide which had been milled to very small particle size at a 5% by weight concentration to a solution of polyvinylcarbazole containing 1% by weight TNF. The mixture was coated on matte finish aluminum. The electrometer data were: CA = 450 volts (+ mode), 780 volts (− mode) T ½ = 0.42(+) and 0.50(−).

What is claimed is:

1. In an electrophotographic reproduction process which comprises selectively rendering portions of a photoconductor electrically conductive by selective exposure to light, the improvement according to which the photoconductor comprises polymolecular aggregates less than five microns in size of a pigment having the formula:

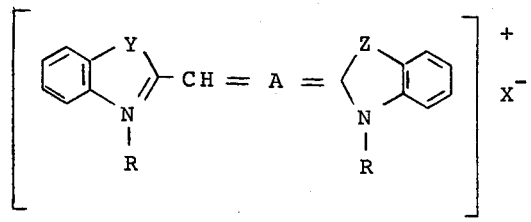

wherein R is selected from the group consisting of methyl, ethyl and allyl, X is selected from the group consisting of the chloride, bromide and iodide ions, Y and Z are each selected from the group consisting of O, S and Se, and A is selected from the group consisting of hydrocarbon chains having the formula

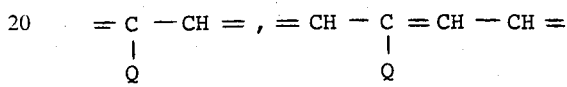

and

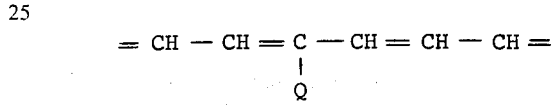

wherein Q is selected from H, CH₃ and C₂H₅.

2. A process as claimed in claim 1 wherein the particles of pigment are less than 1 micron in size.

3. A process as claimed in claim 1 wherein the pigment is in the form of a layer overcoated with a charge transport layer.

4. A process as claimed in claim 1 wherein the pigment is dispersed in a binder.

5. A process as claimed in claim 4 wherein the binder comprises trinitrofluorenone.

6. A process as claimed in claim 4 wherein the binder comprises sucrose benzoate.

7. A process as claimed in claim 1 wherein the pigment is 3,3'-diethyl benzothiozolium dicarbocyanine iodide.

8. A process as claimed in claim 7 wherein the pigment is dispersed in a binder comprising sucrose benzoate.

* * * * *